Figure 1:
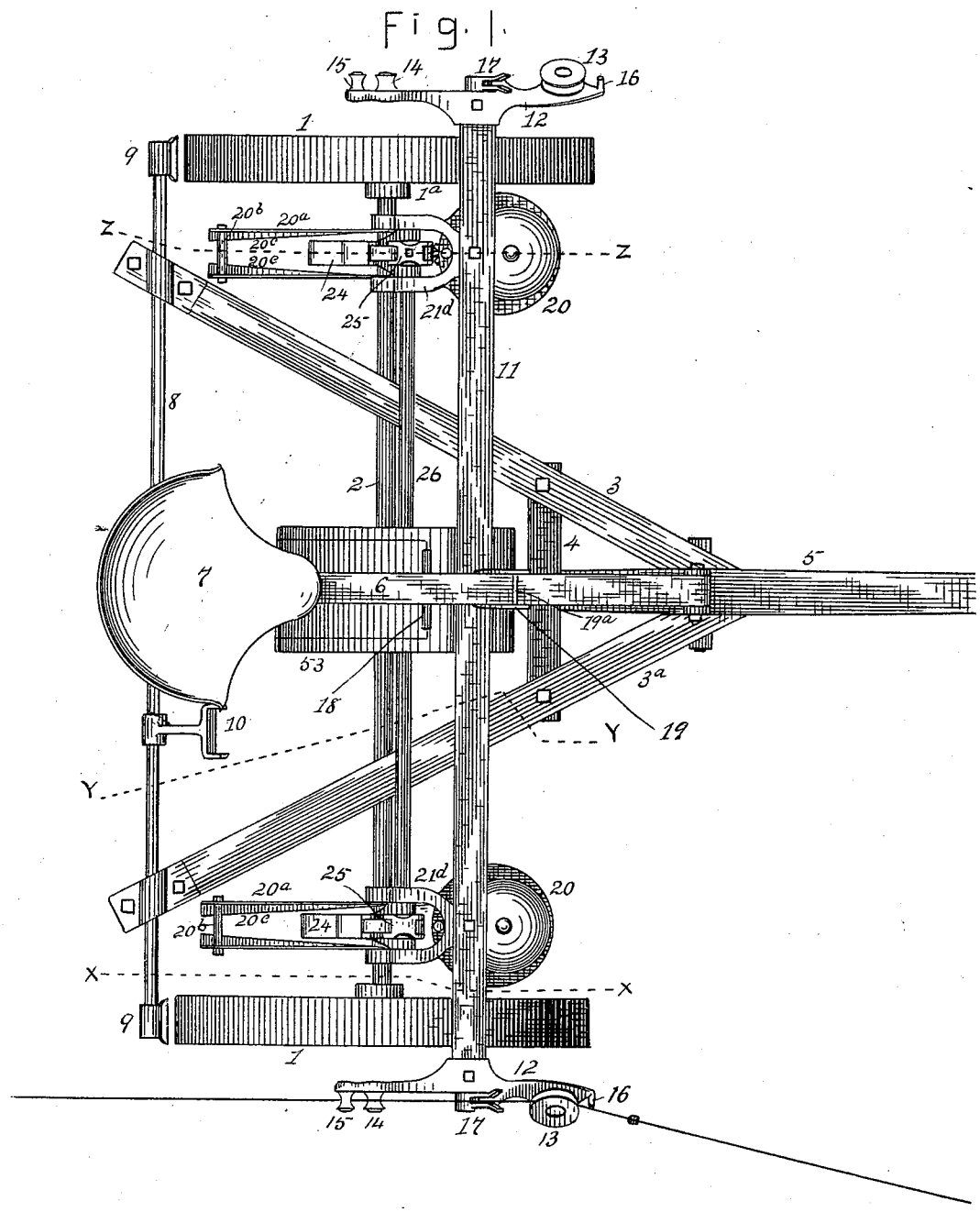

(No Model.) 5 Sheets—Sheet 1.

L. P. GRAHAM.
CORN PLANTER.

No. 479,067. Patented July 19, 1892.

ATTEST
Helen Graham
W. W. Graham

INVENTOR
Levi P. Graham

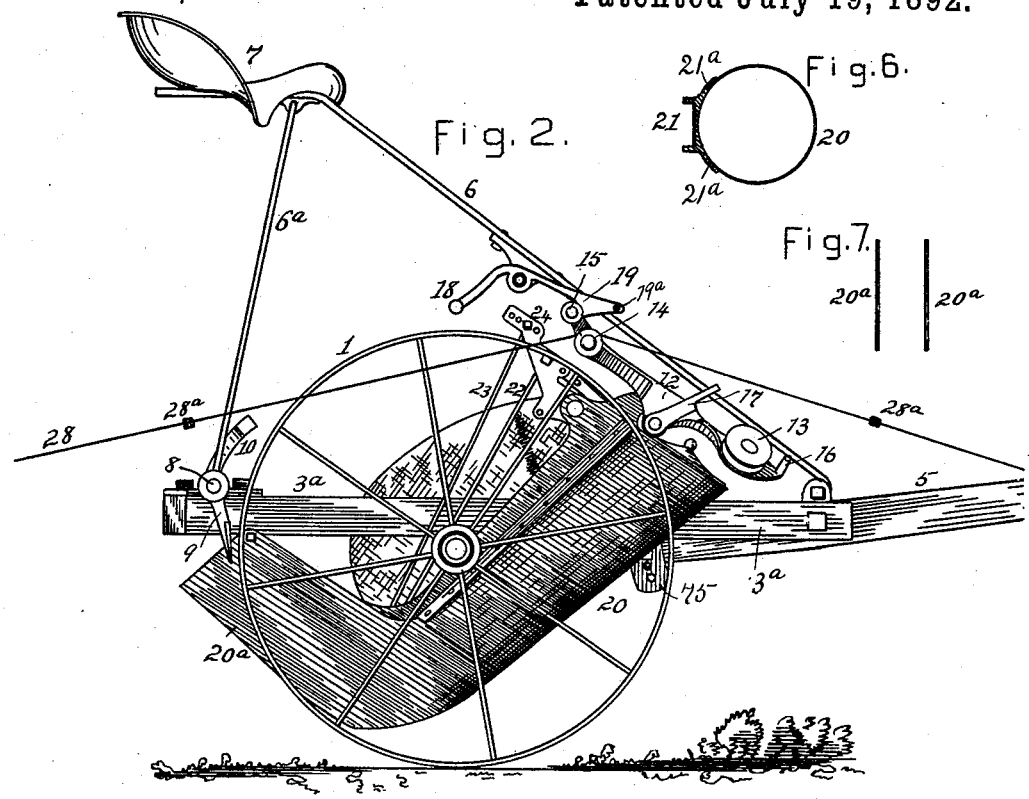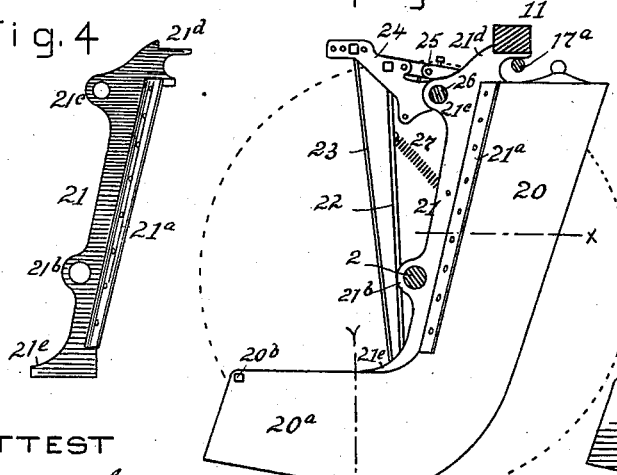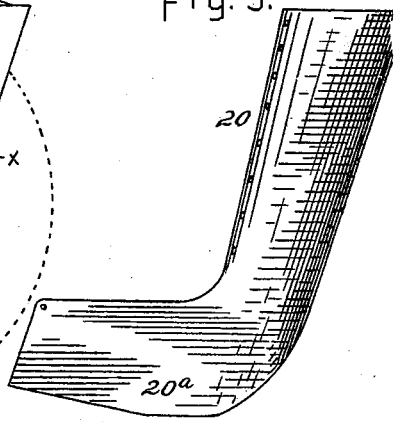

(No Model.)　　　　　　L. P. GRAHAM.　　　5 Sheets—Sheet 3.
CORN PLANTER.
No. 479,067.　　　　　　　　Patented July 19, 1892.
Fig. 9.
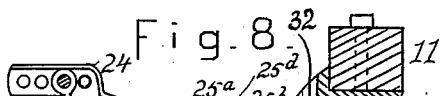
Fig. 8.
Fig. 10.
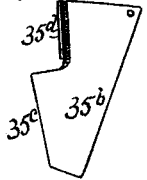
Fig. 12.
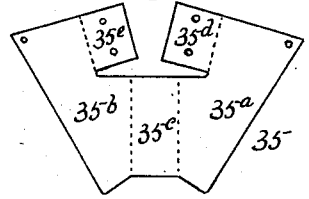
Fig. 11.
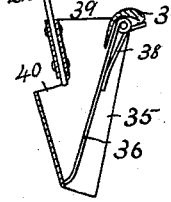
Fig. 13.
ATTEST
Helen Graham
W. W. Graham
Fig. 14.
INVENTOR
Levi P. Graham
THE NORRIS PETERS CO., PHOTO-LITHO., WASHINGTON, D. C.

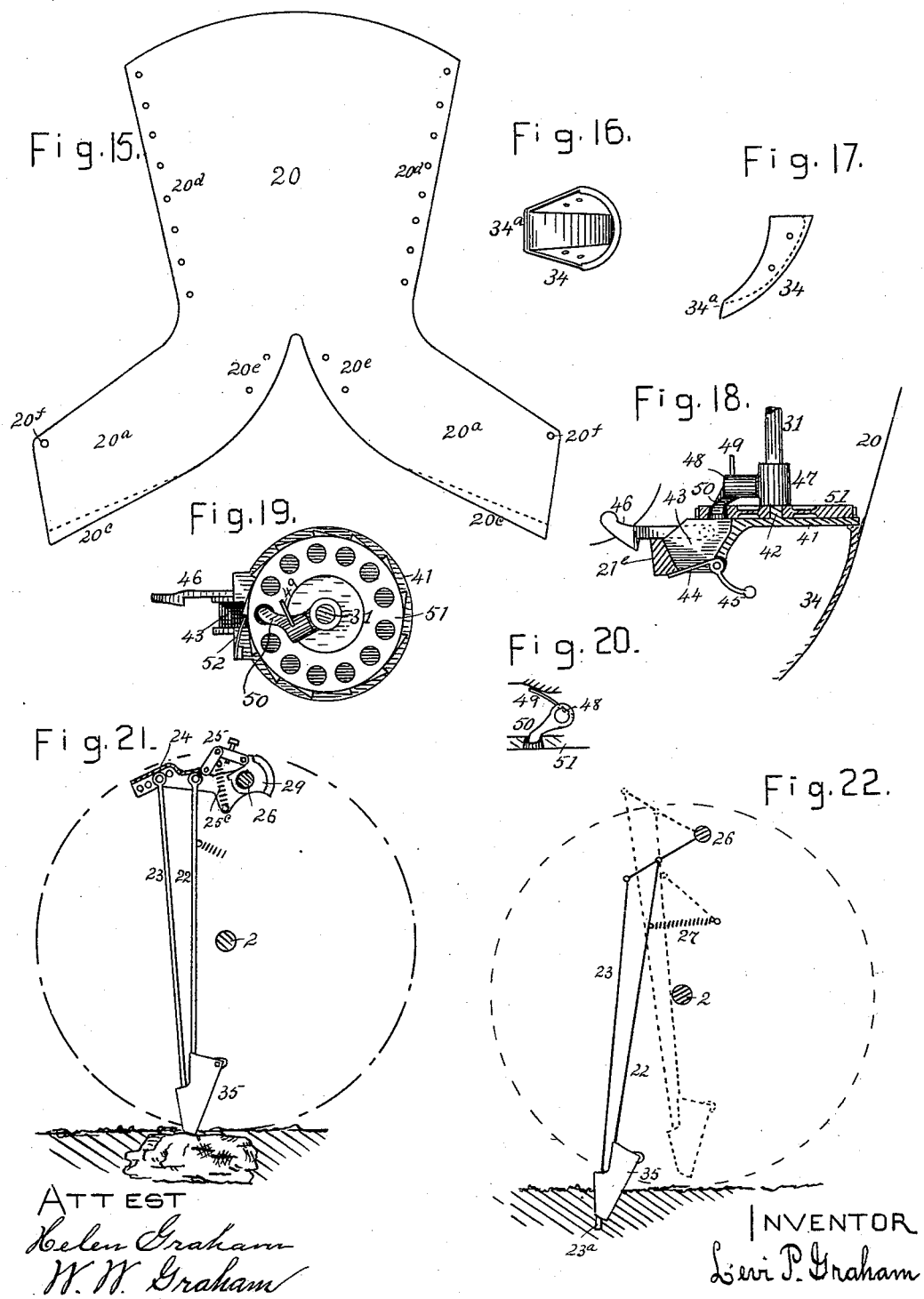

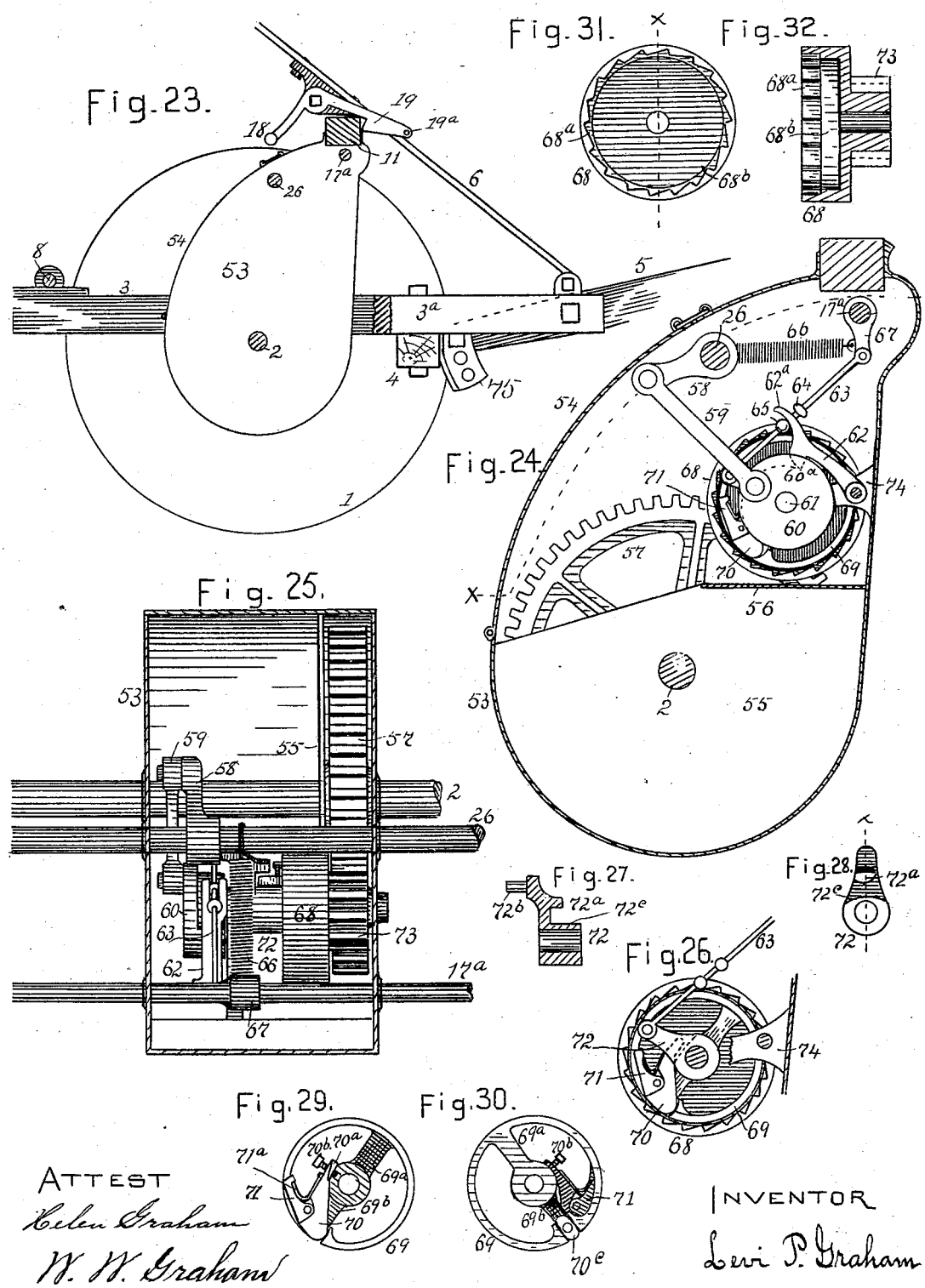

UNITED STATES PATENT OFFICE.

LEVI P. GRAHAM, OF DECATUR, ILLINOIS.

CORN-PLANTER.

SPECIFICATION forming part of Letters Patent No. 479,067, dated July 19, 1892.

Application filed May 9, 1890. Serial No. 351,146. (No model.)

*To all whom it may concern:*

Be it known that I, LEVI P. GRAHAM, of the city of Decatur, county of Macon, and State of Illinois, have invented a certain Improved Corn-Planter, of which the following is a specification.

It is the object of my invention to produce a light and compact prod planter adapted to be operated by a knotted check-row line and to make provision in such planter for uniform depth of planting, for expedition and ease in adjusting the planting mechanism and releasing the check-row line preparatory to turning around, for regulating the depth of planting, for avoiding injury to the machine and interference with the operation thereof when a prod strikes an unyielding object, for insuring continuous and uniform discharge of grain, for the observation by the driver of the operation of planting, for the protection of the prods, for the incasing of the more delicate working parts, and for accuracy and uniformity in checking.

I attain my object by means of the details of construction and combinations of parts hereinafter set forth and claimed, reference being had to the drawings accompanying and forming a part of this specification, and in which the invention is illustrated as follows:
Figure 1 is a plan of my device. Fig. 2 is a side view showing the planting mechanism adjusted preparatory to turning around and illustrating the manner in which the check-row line is automatically discharged or released. Fig. 3 is a side elevation of a hopper and planting mechanism on section-line $x$ in Fig. 1. Fig. 4 is a side elevation of the casting that provides bearings for the main shaft or axle and the rock-shaft that sustains the check-row bar, that has flanges, to which the sheet-metal hopper is secured, and that acts as a stop and guide for the prod. Fig. 5 is a side view of the sheet-metal hopper and prod-protector. Fig. 6 is a horizontal section of the hopper and casting on broken line $x$ in Fig. 3. Fig. 7 is a vertical section of the prod-protector on broken line $y$ in Fig. 3. Fig. 8 is a vertical section through a hopper and planting mechanism on broken line $z$ in Fig. 1. Fig. 9 is a face view of the worm-segment on the rock-shaft that imparts motion to the shaft of the rotary drop of the hopper. Fig. 10 is a top view of the pinion-segment that is fixed on the drop-shaft of the hopper and meshes with the worm-segment shown in Fig. 9. Fig. 11 represents the sheet-metal blank out of which a prod is formed. Fig. 12 is a side view of the blank bent into prod form. Fig. 13 is a vertical section through a prod, showing the relation of the sheet metal to the valve, the spring, and the cast-metal strut. Fig. 14 is a side view of the strut-casting for the prod. Fig. 15 shows the sheet-metal blank from which the hopper and prod-protector is formed. Fig. 16 is a top view of the casting that is secured in the crotch of the hopper-blank and that forms a runner, a support for the seed-disk and adjuncts, and a guide for the prod. Fig. 17 is a side view of the casting shown in Fig. 16. Fig. 18 is a central vertical section through the hopper-bottom and seed-disk, showing the dropping mechanism with the disk-cover removed. Fig. 19 is a plan of a hopper-bottom, a seed-disk, and a disk-actuating arm. Fig. 20 is an end view of a disk-actuating arm, showing its mode of operation. Fig. 21 is a side view of a prod and its actuating-arm, showing the manner in which a trip-toggle relieves the strain when the prod strikes an unyielding obstacle. Fig. 22 represents the action of a prod and plunger and shows how provision is made in the arrangement of the spring to return the prod after a "hill" of grain is deposited and to not interfere with the prod until after the deposit is made. Fig. 23 is a side view of the clutch-box, &c., on broken line Y in Fig. 21. Fig. 24 is a vertical section through the clutch-box, exposing the mechanism therein. Fig. 25 is a plan of the clutch mechanism and gearing, the casing being removed, on broken line $x$ in Fig. 24. Fig. 26 is a view of the clutch mechanism on a section-line immediately behind the crank-wheel. Fig. 27 is a section of the rock-cam that is actuated by the check-row shaft and that actuates the clutch, the section being taken on broken line $x$ in Fig. 28, which is a face view of such rock-cam. Fig. 29 is a front view of the split expansible ring of the clutch, the arm for expanding the same, and the auxiliary pawl. Fig. 30 is a rear view of the same mechanism. Fig. 31 is a face view of the band that coacts with the expansible ring and the auxiliary pawl. Fig. 32 is a sectional view on broken line x, Fig. 31.

Bars 3 and 3ª connect pivotally with tongue 5 and diverge rearwardly. They are connected at their rear ends by rod 8, which carries scrapers 9, has the actuating rock-pedal 10, and acts as a step for the driver. They are also connected intermediately by cross-bar 4, which carries the tongue-adjusting rack 75. Shaft 2 has bearings in bars 3 and 3ª and it acts as an axle for wheels 1. The hoppers 20 are loosely connected with the shaft 2 and they support the check-row bar 11. Bar 6 extends obliquely upward and backward from the junction of the tongue and frame, it carries seat 7, and it has a catch 19, that holds the check-row bar and the hoppers in the position shown in Figs. 1 and 2. The catch has a pedal extension 18, by means of which it is detached from the check-row bar, and it also has the stop 19ª, that rests on bar 6 and limits the downward motion of the catch. Heads 12 are attached one to each end of the check-row bar and they furnish bearings for the check-row shaft 17ª, which extends under bar 11. Each head has an oblique front pulley 13 and guide-finger 16. It also has a rear pulley 14 and a pulley or equivalent guide 15 above and to the rear of pulley 14. The check-row shaft has the customary forked levers 17, one at each end and in line with the guide-pulleys. Each hopper is in front of the main shaft and it extends downward from a point nearly in line with the tops of the wheels to a point considerably below the main shaft, where it merges into a rearwardly-extending prod-protector 20ª.

The casting 21 (shown separated from other parts of the machine in Fig. 4) has the bearing 21ᵇ for the main shaft, bearing 21ᶜ for the rock-shaft, bracket 21ᵈ for the check-row bar, stop or buffer 21ᵉ for the prod, and flanges 21ª, to which the sheet-metal hopper and prod-protector 20 and 20ª are riveted.

Blank 20 20ª 20ª, as seen in Fig. 15, is struck out of sheet metal and the holes 20ᵈ, 20ᵉ, and 20ᶠ are punched. The blank is then bent until the hopper portion assumes the required circular form and the sides 20ª lie parallel, when, or previous thereto, the portions 20ᶜ are bent inwardly at right angles to their respective body portions. The holes 20ᵈ are then used to rivet the hopper to the flanges of casting 21. The shoe or runner 34 (seen in Figs. 16 and 17) is secured in the crotch of the blank by rivets passing through holes 20ᵉ, and a strut is secured between the upper rear portions of the sides of the prod-protector, as seen at 20ᵇ in Figs. 1, 3, and 8, and secured by a binding-bolt extending through such strut and through the holes 20ᶠ of the blank. The bottom plate 41 is placed in the hopper on a ledge formed by shoe 34. The seed-disk 51 is fitted on pin 42 of the bottom plate. The shaft 31 is fitted with the disk-propelling arm 48, the disk-cover 33, the pinion-segment 30, and, if desired, the stirring-pin 31ª, (seen in Fig. 8,) and is then placed in position over the seed-disk, and the entire dropping mechanism is secured in position by fitting the plate 32 over the upper end of shaft 31, as seen in Fig. 8, and bolting it to the top of the hopper-casting. The bottom plate 41 has the chute 43, which, with stop 21ᶜ and valve 44, forms a seed-retaining cavity. It also has a latch 46, that catches a shoulder of the prod-bar, as seen in Fig. 8. The valve 44 has the counter-balanced arm 45, that is tripped by the prod to discharge the grain, and such arm may be provided with a spring that will increase the efficiency of the weight in closing the valve and at the same time act to some extent as a buffer for the prod. The shaft 31 has oscillating motion equal in extent in this particular case to about a one-twelfth rotation, and the finger 50, pivoting on arm 48, is carried back and forth in line with the cells of the seed-disk. A rod 49 is secured to finger 50, and it is either elastic or may be provided with a spring arranged to act as the retrograde motion of the finger is completed and press the finger against the disk. The disk has ratchet-teeth, preferably on its periphery, as seen in Fig. 19, and a pawl 52, acting on such teeth, prevents back motion in the disk.

The worm-cam 29 has the threads 29ª. (Shown in Fig. 9.) It meshes with the teeth 30ª of pinion-segment 30, (seen in Fig. 10,) and it is keyed or otherwise fixed on the rock-shaft 26. The arm 24 straddles the worm-cam and is mounted loosely on the rock-shaft. The worm-cam is connected with the arm by a trip-toggle composed of bars 25ª and 25ᵇ, connected together pivotally and pivoted the one to the arm and the other to the worm-cam. Spring 25ᶜ tends to hold the bars of the toggle-joint as nearly as possible in longitudinal alignment, and the set-screw 25ᵈ, bearing against a shoulder of the worm-cam, enables the angle formed by the toggle-bars to be varied at will.

The prod-bar 22 and the plunger-bar 23 are connected with arm 24 in a manner permitting free swinging motion in the direction of the motion of the planter, and they are held normally in the position shown in Fig. 8 by latch 46 and oblique spring 27, which is connected at one end with the prod-bar and at the other end with the hopper-casting. The prod-bucket is formed largely of the blank shown in Fig. 11, in which 35ª and 35ᵇ represent side portions, 35ᶜ the back portion, and 35ᵈ and 35ᵉ the securing-flaps. The blank is bent at right angles on the broken lines, leaving the parts as shown in Fig. 12, after which the lower end of the prod-bar is inserted between the flaps and secured there by rivets or bolts. The strut-casting 37 has the recesses 37ª, one in each side, corresponding in shape to the corners of the prod-blank, and it also has the perforated ears 37ᵇ, one on each side, through which the binding-bolt passes and between which the valve pivots. The valve 36 is placed in position in the strut-casting, as is also the spring 38. The casting is placed in position in the prod-blank and the binding-bolt is passed through blank, casting, valve, and spring, securing the spring in position, forming a pivot for the valve, and binding the blank to the strut-casting. The prod-bucket so formed has the opening 39 to admit the seed, the opening 40 to admit the plunger, and the casting 37 to strike the trip-arm of valve 44. The rock-shaft 26 is given oscillation equal to about one-sixth rotation (or sixty degrees) each time a check-row lever encounters a knot on the check-row line. It forces the prod and plunger downward into the soil, permitting valve 44 to close, and at the same time rotates the seed-disk sufficiently to drop a hill of corn into cavity 43.

The plunger has greater motion than the prod, owing to the greater distance of its connection with the arm from the rock-shaft, and it extends below the prod when at its greatest depth and forces the corn into the ground. As the prod descends the tension of spring 27 is diminished, and when the ground is reached there is no tendency to drag the prod forward and mar the accuracy of the check-rows. By the time the prod has become well embedded in the soil the spring will again begin to exert tension, which will increase as the prod rises and return the prod and plunger to their original position, where they will be retained by latch 46 until another check-row knot is encountered. During the swing of the prod sides $20^a$ afford protection from clods, &c., that might otherwise roll in the path and obstruct the return motion. The prods are placed under the main shaft near the wheels and near the ground, the first two provisions enabling the wheels to act as guides to regulate the approach of the prods to the ground. In very rough ground, however, it may happen that a wheel will ride over a clod at the time of seed deposit and raise the prod so high that it will be carried past the proper depositing-point before penetrating the ground. To neutralize this effect, which would of course result in irregular checking, the shoe 34 terminates at $34^a$ in such position that should the prod not strike the ground and be carried backward in a proper manner the inclined front of the prod-bucket will bear against termination $34^a$ and the prod will be forced backward as well as downward, thus compensating for the forward motion of the planter the same as if the ground had been penetrated at the proper time. The motion of the rock-shaft 26 is imparted to shaft 31 through a worm and pinion, as before explained, and the motion of the shaft 31 is imparted to the disk through finger 50. The finger engages a cell of the disk, as seen in Figs. 18, 19, and 20, and gives the disk a partial rotation at each operation of the rock-shaft. As the finger is returned to its original position after each operation, the spring 49 encounters an obstruction, as indicated in Fig. 20, or is otherwise put under tension, with the result that the finger is forced sharply into a cell, thereby removing all grains that may by any chance become lodged. The disk-cover 33 is made in the customary manner and is provided with a suitable cut-off. (Not shown.) The rod $31^a$ may be placed over the bridge of the disk-cover and by its constant agitation will prevent the grain from packing and insure filling of the cells. The grain in cavity 43 is exposed to view during the swing of the prod, and the operation of the finger may be open to observation, if desired.

So far as ordinary operation is concerned the arm 24 is practically rigid on the rock-shaft 26, the toggle-joint being so adjusted that the prods will penetrate the soil and deposit the corn. When an unyielding obstacle is encountered, however, as indicated in Fig. 21, the trip-toggle will buckle up and permit the completion of the throw of the rock-shaft and the opposite prod.

As a substitute for strut $20^b$, a casting having attachments for interchangeable covering devices may be secured to the rear of the prod-protector, or a covering device of any suitable construction may be permanently attached. Except for the purpose of leveling, ridging, or depressing the soil along the row, as may be found desirable in different localities and under different circumstances, but little need will be found for such attachments, as the plungers will embed the grains in the soil in a manner to insure proper and immediate sustenance for the roots, and the withdrawal of the prods and plungers will insure a loose covering of fine soil, through which the stalks will readily spring.

Should it be desired to scatter the grains in a hill, wider prods may be used, or the prod-buckets may be made in two separate parts and a scatter-plate be introduced to divide the grains between the two parts.

The depth at which the corn is deposited may be regulated by shifting the connections of the prod and plunger nearer to or farther from the rock-shaft. In this case provision is shown for shifting the plunger only, and a variation will cause the plunger to project more or less beyond the end of the prod. (See $23^a$ in Fig. 22.) When the end of the field is reached, the pedal 18 is depressed, disengaging the catch 19 from the check-row bar and permitting the hoppers, &c., to assume the position shown in Fig. 2. This raises the prod-protectors clear of the ground and discharges the check-row line from the check-row pulleys, after which the machine is turned around, the parts are readjusted, and planting is resumed. When the check-row head is in a horizontal position, the line lies in the oblique pulley and extends through the fork of the lever and under pulley 15, which by its position holds the line in pulley 14. When the bar is tipped, as seen in Fig. 2, the front pulley and check-row lever are lowered from contact with the line, which is at the same time elevated by pulley 14, and the pulley 15 assumes a position that permits the natural side draft of the line to effect the detachment.

The clutch mechanism whereby the carrying-wheels are made to actuate the rock-shaft by the intervention of the check-row line is located centrally and suitably incased. The casing is seen at 53, in Figs. 1, 2, 23, and 24, and it has the door 54, that makes the mechanism accessible. The lower part of the box may be divided into two compartments by partition 55, one of which will inclose the gear-wheel 57 and the other may be used as a tool-box. In case of such use the partial covering or horizontal partition 56 will prevent the articles in the box from coming in contact with the clutch mechanism when the hoppers are tilted at the ends of the field or at other times. The shaft 61 has the crank-wheel 60 and the split clutch-ring 69 keyed or otherwise rigidly mounted, and it has the loosely-mounted pinion and band 73 68 and the cam-arm 72 also loosely mounted. The rock-shaft 26 has the arm 58, that is connected with the crank-wheel by pitman 59, and the check-row shaft has the arm 67, that is connected with the cam-arm by rod 63. Spring 66 returns arm 67 to its shown position after each operation of the check-row line. The wheel 60 has a stop-tooth 60$^a$, with which pawl 62 engages to arrest the motion of the wheel, and the pawl is forked at its swinging end and placed astride the rod 63 between balls or knobs 64 and 65. The clutch-band 68 has the friction-rim 68$^b$ and the ratchet-rim 68$^a$, as seen in Figs. 31 and 32, and it is integral with pinion 73. The split or divided ring 69 has the spoke 69$^a$, by means of which it is connected with shaft 61, and it has the spoke or arm 69$^b$, that provides a bearing for the cam-arm 70, which effects the expansion necessary to make the ring engage the friction-rim of band 68. The cam-arm 70 has the set-screw 70$^b$, by means of which adjustment is made with relation to the cam-arm 72, and it has the lateral extension 70$^a$, that coacts with a projection on cam-arm 72 to insure the contraction of the divided ring at the proper time. It also has the cam 70$^c$, (seen only in Fig. 30,) whereby the ring is expanded. Pawl 71 is pivoted on arm 70 in a manner permitting independent inward motion, but precluding independent outward motion, and it has the spring 71$^a$ (see Fig. 29) interposed between itself and the arm. The cam-arm 72 has the projection 72$^a$, that acts on extension 70$^a$ in case the split ring does not promptly contract. It has the pivot-pin 72$^b$, with which the rod 63 connects, and it has the cam-surface 72$^c$, that acts on cam-arm 70$^c$ to expand the ring. The gear-wheel 57 is keyed on the main shaft 2 and it meshes with pinion 73, as seen in Fig. 25. The ring fits snugly in band 68, but without actual contact, and the end of cam-arm 70 lies ordinarily between cam-surface 72$^c$ and projection 72$^a$ in a manner to prevent the expansion of the ring or the engagement of pawl 71 with the teeth of rim 68$^a$.

When a check-row lever is actuated by a knot on the line, arm 67 raises the stop-pawl 62 out of contact with the crank-wheel and simultaneously rocks cam-arm 72, which in turn rocks cam-arm 70, thereby expanding the divided ring into frictional contact with the continuously-revolving rim 68$^b$ and carrying pawl 71 into contact with the teeth of rim 68$^a$. The ensuing rotation of the crank-wheel imparts the rocking motion to shaft 26, with the effect on the planting mechanism heretofore described, and such rotation is arrested by pawl 62 when all the parts have reassumed their shown positions. The prods tend to fall to the ground by their own weight, and in this they are assisted to a slight extent by the springs 27, so that the friction-clutch meets with no material resistance until the prods have penetrated the ground to some extent and the positions of the hills have been definitely determined. The pawl 71 is pressed against the toothed rim 68$^a$ when the split ring is expanded and into mesh or against a tooth, as the case may be. Should it not happen to strike in mesh, the spring 71$^a$ will yield and leave the pawl ready to engage a tooth and effect a rigid clutch in case the resistance of the ground should cause the friction-ring to slip. By this means the quick and uniform action of a friction-clutch is obtained at a time when there is no resistance and when the accuracy of checking demands such action, and the reliability of a ratchet-clutch is obtained after the prods are in the ground and when a little lost motion is of no consequence. The shaft 61 has suitable bearings in the clutch-box, bracket 74 suggesting one such bearing and the opposite side of the box easily providing another.

The prods and the hopper may be made of cast metal in a readily obvious manner, in which case the prods and arms may be integral, as may also the hoppers and their castings 21 and 34. This convenience would be obtained at the expense of strength and lightness, as compared with the sheet-metal constructions heretofore set forth, and would probably be more than counterbalanced thereby.

Throughout the description the prods, hoppers, &c., have generally been mentioned in the singular; but it is obvious from the drawings and from the general knowledge on such subjects that two sets of such devices are or may be mounted on the same frame and act simultaneously in the manner described. The prods, as shown, enter the ground nearly as far as the plungers; but by connecting the prod-bars with the rock-arms nearer the pivots of the arms the motion of the prods may be made to extend only to the ground, leaving the seed to be deposited by the plungers in the ordinary manner.

I claim as new and desire to secure by Letters Patent—

1. In corn-planters, the combination of a seed-hopper having dropping mechanism in its lower end, a rock-arm pivoted at or near the upper end of the hopper, and a seed-depositing prod-bucket suspended from the rock-arm held normally under the vent of the hopper and adapted to swing rearwardly from the hopper at each planting operation.

2. In corn-planters, the combination of a seed-hopper having dropping mechanism in its lower end, a valve on which the grain falls from the dropping mechanism, a rock-arm having a pivot at or near the upper end of the hopper, and a seed-depostiting prod-bucket suspended from the rock-arm and adapted to open the valve and receive the grain therefrom.

3. In corn-planters, the combination of a rock-arm, a corn-receiving prod-bucket suspended from the arm at some distance from the pivot thereof, and a corn-depositing plunger in the prod-bucket and suspended from the rock-arm at a greater distance from the pivot, whereby the plunger may travel farther than the prod-bucket and the travel of both may be regulated by varying the extent of the oscillation of the rock-arm.

4. In corn-planters, the combination of a prod-bucket having a front valve, an actuating-bar secured to the prod-bucket approximately midway between the valve and the rear wall, and a plunger in the space between the bar connection and the rear wall of the prod-bucket.

5. In corn-planters, the combination of a seed-depositing prod having a downward and upward motion and also a pendulous motion, and a latch or catch securing the prod against pendulous motion until the downward motion shall have begun.

6. In corn-planters, the combination of a rock-arm, a seed-depositing prod-bucket swung therefrom, and an extension-spring connected with the prod-bar and with a relatively immovable part of the planter in an oblique position.

7. In corn-planters, the combination of carrying-wheels on a main shaft, a rock-shaft carrying seed-depositing prod-buckets, a crank adapted to impart motion to the rock-shaft, and clutch-gearing connecting the main shaft with the crank and adapted to be actuated by the knots on a check-row line, whereby the rock-shaft is oscillated by the rotation of the crank when the clutch is in mesh.

8. A check-row bar or head for corn-planters having guide-pulleys and the customary forked lever, and also having tilting motion on a pivot parallel with the axle of the planter, whereby the rear guide-pulleys are elevated, the front pulley depressed, and the check-row line automatically discharged from the pulleys and lever.

9. In corn-planters, the combination of a wheel or carrying-frame, a seed-hopper pivoted in the frame on a transverse pivot, a check-row head carried by the hopper above the pivot, and planting mechanism carried by the hopper below the pivot, whereby the planting mechanism is raised and the check-row line discharged when the hopper is tilted on its pivot.

In testimony whereof I sign my name in the presence of two subscribing witnesses.

LEVI P. GRAHAM.

Attest:
 W. W. GRAHAM,
 HELEN GRAHAM.